United States Patent [19]

Yamamoto et al.

[11] 4,150,401
[45] Apr. 17, 1979

[54] FACSIMILE SIGNAL CONVERTER

[75] Inventors: Seiichi Yamamoto, Tokyo; Kozo Nakao, Hoya; Naohiko Hattori; Hiroichi Teramura, both of Tokyo; Yasuhiro Yamazaki, Hiratsuka; Yasushi Wakahara, Tokyo, all of Japan

[73] Assignee: Kokusai Denshin Denwa Kabushiki Kaisha, Japan

[21] Appl. No.: 919,613

[22] Filed: Jun. 27, 1978

Related U.S. Application Data

[63] Continuation-in-part of Ser. No. 728,029, Sep. 30, 1976, abandoned.

[30] Foreign Application Priority Data

Oct. 3, 1975 [JP] Japan .............................. 50/118816

[51] Int. Cl.$^2$ .............................................. H04H 7/12
[52] U.S. Cl. ..................................... 358/260; 358/284
[58] Field of Search ............... 358/260, 138, 261, 262, 358/284, 137, 133

[56] References Cited

U.S. PATENT DOCUMENTS

| | | | |
|---|---|---|---|
| 3,956,578 | 5/1976 | de Loye et al. ...................... | 358/260 |
| 3,980,809 | 9/1976 | Cook ..................................... | 358/260 |
| 4,028,731 | 6/1977 | Arps et al. ............................ | 358/260 |

Primary Examiner—Robert L. Griffin
Assistant Examiner—Edward L. Coles
Attorney, Agent, or Firm—Robert E. Burns; Emmanuel J. Lobato; Bruce L. Adams

[57] ABSTRACT

A facsimile signal converter for converting an input facsimile signal into an output facsimile signal having a scanning line density different from that of the input facsimile signal. A table circuit is provided for developing white and black states of each output picture element of the output facsimile signal in correspondence to a predetermined number of combinations of states of reference picture elements and the geometric relation between the reference picture elements and the output picture elements. The reference picture element corresponds to at least one input picture element of the input facsimile signal adjacent to each output picture element of the output facsimile signal in consideration of a state of superimposing an input pattern on an output pattern indicated respectively by the input facsimile signal and the output facsimile signal. The white and black states of the output picture elements are read out from the table circuit to provide the output facsimile signal in response to each input picture element of the input facsimile signal on the base of the instant conditions of the geometric relation and the reference picture elements.

6 Claims, 14 Drawing Figures

| GEOMETRIC RELATION | REFERENCE PICTURE ELEMENT / OUTPUT PICTURE ELEMENT | 1 1 1 1 | 1 1 1 0 | 1 1 0 1 | 1 1 0 0 | 1 0 1 1 | 1 0 1 0 | 1 0 0 1 | 1 0 0 0 | 0 1 1 1 | 0 1 1 0 | 0 1 0 1 | 0 1 0 0 | 0 0 1 1 | 0 0 1 0 | 0 0 0 1 | 0 0 0 0 |
|---|---|---|---|---|---|---|---|---|---|---|---|---|---|---|---|---|---|
| 6A | m(1,1) | 1 | 1 | 1 | 1 | 0 | 0 | 0 | 0 | 1 | 1 | 1 | 1 | 0 | 0 | 0 | 0 |
| 6B | m(1,2) | 1 | 1 | 1 | 1 | 1 | 0 | 0 | 0 | 1 | 1 | 1 | 0 | 0 | 0 | 0 | 0 |
| 6B | m(1,3) | 1 | 1 | 1 | 1 | 1 | 1 | 1 | 0 | 1 | 0 | 0 | 0 | 0 | 0 | 0 | 0 |
| 6A | m(1,4) | 1 | 1 | 1 | 1 | 1 | 1 | 1 | 1 | 0 | 0 | 0 | 0 | 0 | 0 | 0 | 0 |
| 6B | m(2,1) | 1 | 1 | 1 | 1 | 1 | 0 | 0 | 0 | 1 | 1 | 1 | 0 | 0 | 0 | 0 | 0 |
| 6C | m(2,2) | 1 | 1 | 1 | 1 | 1 | 0 | 0 | 0 | 1 | 1 | 1 | 0 | 0 | 0 | 0 | 0 |
| 6C | m(2,3) | 1 | 1 | 1 | 1 | 1 | 1 | 1 | 0 | 1 | 0 | 0 | 0 | 0 | 0 | 0 | 0 |
| 6B | m(2,4) | 1 | 1 | 1 | 1 | 1 | 1 | 1 | 0 | 1 | 0 | 0 | 0 | 0 | 0 | 0 | 0 |
| 6B | m(3,1) | 1 | 1 | 1 | 0 | 1 | 1 | 0 | 0 | 1 | 1 | 0 | 0 | 1 | 0 | 0 | 0 |
| 6C | m(3,2) | 1 | 1 | 1 | 0 | 1 | 1 | 0 | 0 | 1 | 1 | 0 | 0 | 1 | 0 | 0 | 0 |
| 6C | m(3,3) | 1 | 1 | 1 | 0 | 1 | 0 | 1 | 0 | 1 | 0 | 1 | 0 | 1 | 0 | 0 | 0 |
| 6B | m(3,4) | 1 | 1 | 1 | 0 | 1 | 0 | 1 | 0 | 1 | 0 | 1 | 0 | 1 | 0 | 0 | 0 |
| 6A | m(4,1) | 1 | 1 | 0 | 0 | 1 | 1 | 0 | 0 | 1 | 1 | 0 | 0 | 1 | 1 | 0 | 0 |
| 6B | m(4,2) | 1 | 1 | 1 | 0 | 1 | 1 | 0 | 0 | 1 | 1 | 0 | 0 | 1 | 0 | 0 | 0 |
| 6B | m(4,3) | 1 | 1 | 1 | 0 | 1 | 0 | 1 | 0 | 1 | 0 | 1 | 0 | 1 | 0 | 0 | 0 |
| 6A | m(4,4) | 1 | 0 | 1 | 0 | 1 | 0 | 1 | 0 | 1 | 0 | 1 | 0 | 1 | 0 | 1 | 0 |

FACSIMILE SIGNAL CONVERTER

CROSS-REFERENCE TO RELATED APPLICATION

This application is a continuation-in-part of our copending U.S. application Ser. No. 728,029 filed on Sept. 30, 1976 and now abandoned.

FIELD OF THE INVENTION

The present invention relates to a facsimile signal converter for converting an input facsimile signal into an output facsimile signal having a scanning line density different from that of the input facsimile signal.

BACKGROUND OF THE INVENTION

Heretofore, studies on the scanning line density conversion systems have been conducted in the field of the international television transmission system, primarily centered on the system composed of a camera and a picture monitor and the line interpolation system. The former system is less costly, with such a demerit of picture deterioration as non-linear distortions, and the latter system has a defect of involving complicated processing. In facsimile communication, since its conversion system, as far as its application field and condition are concerned, is different from that for a television system in respect that as the signal is obtained in the form of hard copy, while a high degree of real time nature is not required, the effect of its conversion distortion tends to stand out. In respect to the scanning line density conversion of facsimile signal, such systems as OPC (ordinal processing conversion) and SPC (selective processing conversion) were proposed (See: The 7th National Convention of the Institute of Image Electronics Engineers of Japan, Collection of scripts, script No. 10, May 19, 1975). These systems are either to successively read out the picture elements of an original picture for successively replacing the picture elements of the converted output picture by the original picture, or to replace the pictue elements of the output picture by the nearest picture elements of the original picture. As the effect of distortion on the picture due to the conversion of the scanning line density fluctuates in accordance with the relative position between the picture elements of the output picture and those of the original picture, they tend to undergo a deterioration in the quality of the picture such that the contour of an output picture become inordinately large.

SUMMARY OF THE INVENTION

An object of this invention is to provide a facsimile signal converter of simple circuitry with negligible conversion distortion.

In accordance withh the principle of this invention, a table circuit is provided for developing white and black states of each output picture element of the output facsimile signal in correspondence to a predetermined number of combinations of states of reference picture elements and the geometric relation between the reference picture element and the output picture elements. The reference picture element corresponds to at least one input picture element of the input facsimile signal adjacent to each output picture element of the output facsimile signal in consideration of a state of superimposing an input pattern on an output pattern indicated respectively by the input facsimile signal and the output facsimile signal. The white and black states of the output picture elements are read out from the table circuit to provide the output facsimile signal in response to each input picture element of the input facsimile signal on the base of the instant conditions of the geometric relation and the reference picture element.

BRIEF DESCRIPTION OF THE DRAWINGS

The principle, construction and operation of this invention will be understood from the following detailed description taken in conjunction with the accompanying drawings, in which.

DETAILED DESCRIPTION OF THE INVENTION

Figure 1A:
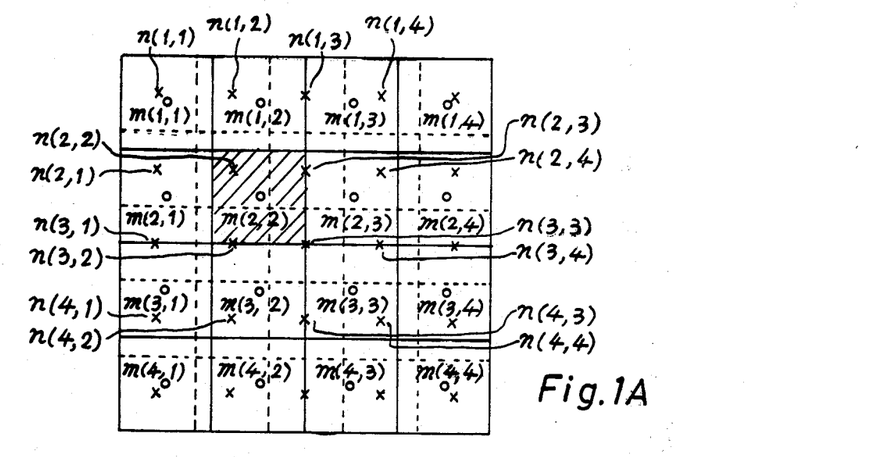
FIGS. 1A, 1B, 4 and 8 are arrangement diagrams of picture elements of an input original picture and an output picture explanatory of the principle of this invention.
Figure 1B:
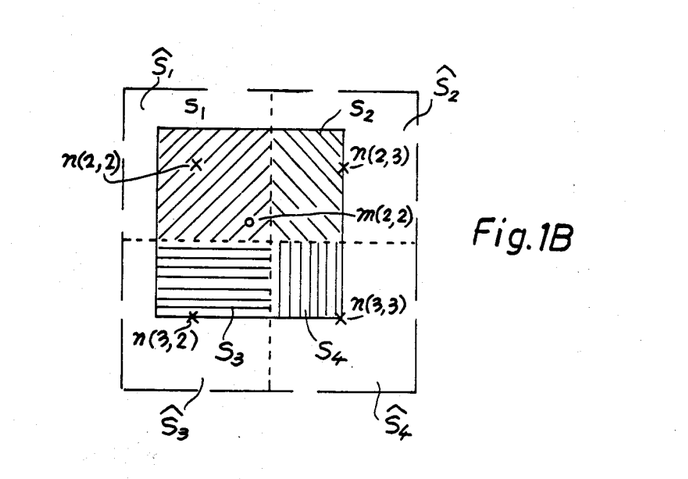

With reference to FIG. 1, the principle of the invention will be described for a case in which an output picture having a scanning line density of 4 lines/mm is to be obtained from the original picture having a scanning line density of 5 lines/mm. FIG. 1A shows an Arrangement of picture elements in a unit area, in which the x-marked $n(1.1)$, $n(1.2)$, . . . are the original picture elements where the picture was scanned over with the scanning line density of 5 lines/mm. In this case, however, it is also assumed that the picture is sampled with the scanning line density of 5 lines/mm in the main scanning direction. The o-marked $m(1.1)$, $m(1.2)$, . . . are output picture elements where scanning is made with the scanning line density of 4 lines/mm, and in this case, it is also assumed that, the main scanning line density is of 4 lines/mm. The sections cut off with broken lines indicate the zones denoted by the elements of the original pictures, and the sections divided by solid lines indicate the zones denoted by the elements of the respective converted pictures. Now for the sake of simplicity, let the case of the output picture element $m(2.2)$ be exemplified in the following: FIG. 1B illustrates the relations of the output picture element $m(2.2)$ with respect to the neighboring picture elements $n(2.2)$, $n(2.3)$, $n(3.2)$, $n(3.3)$ in the original pictures. Symbols $S_1$, $S_2$, $S_3$ and $S_4$ denoted by respectively different hatchings represent areas where the zones denoted by the respective original picture elements $n(2.2)$, $n(2.3)$, $n(3.2)$ and $n(3.3)$ superimpose on the zone denoted by the output picture element $m(2.2)$; and symbols $\hat{S}_1$, $\hat{S}_2$, $\hat{S}_3$ and $\hat{S}_4$ illustrate areas of the respective zone denoted by the original picture elements n(2.3), n(2.3), n(3.2) and n(3.3).

In the SPC system described here, since the tone of the nearest input picture element is adopted as the tone value of the output picture element, the value of m(2.2) in this case is the value of n(2.2).

Generally, as the value of the original picture element n(i.j) represents the tone of the zone denoted by the picture element, it comes in this case to represent by the tone of the area $\hat{S}_1$ the tone of the zone denoted by output picture element m(2.2), (viz., the zone denoted by $S_1$, $S_2$, $S_3$, and $S_4$), resulting, therefore, in causing unnaturalness to the output picture. In the present invention, the composite tone of areas $S_1$, $S_2$, $S_3$ and $S_4$ is representative of the value of m(2.2). The tones of areas $S_1$, $S_2$, $S_3$ and $S_4$ are the same as the tones of areas $\hat{S}_1$, $\hat{S}_2$, $\hat{S}_3$ and $\hat{S}_4$ respectively here. Namely, the composite tone value of the output picture element m(2.2) is represented by:

$$m(2.2) = \{S_1 \times n(2.2) + S_2 \times n(2.3) + S_3 \times n(3.2) + S_4 \times n(3.3)\}/(S_1 + S_2 + S_3 + S_4) \quad (1)$$

In the case of the binary level, such as the black and white facsimile, the converted picture elements can be determined either white or black by comparing the composite tone value with the threshold value which can be optionally set.

Figure 2A:
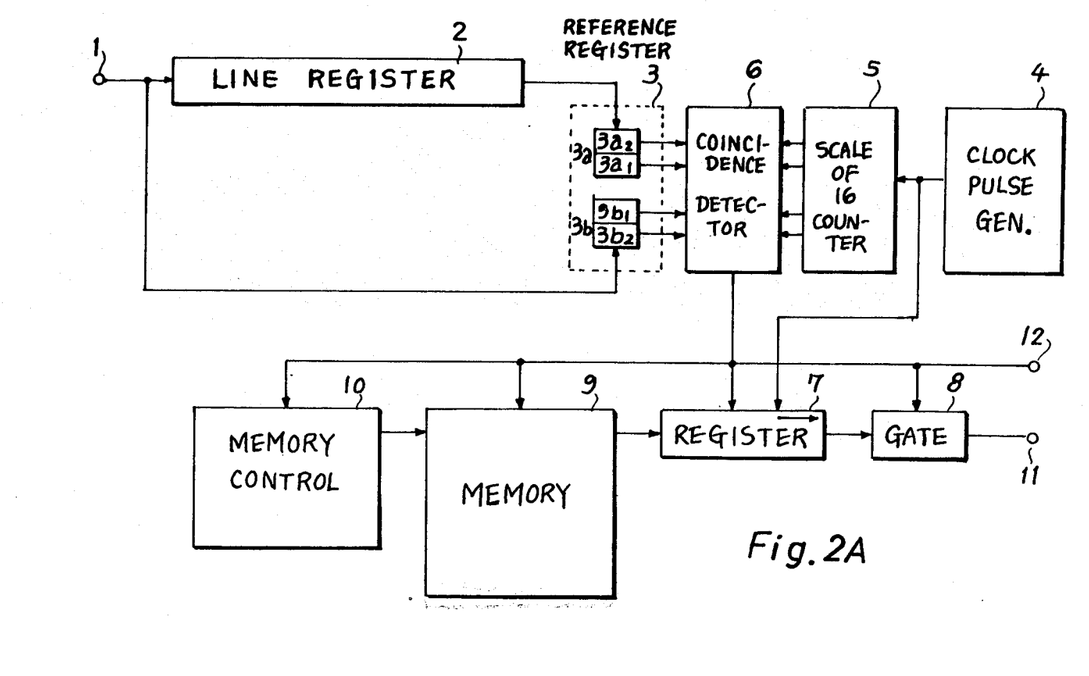
FIG. 2A is a block diagram illustrating an embodiment of this invention.

With reference to FIG. 2A, an embodiment of this invention will be described for the conversion of the scanning line density of 5 lines/mm to the 4-line density. In FIG. 2A, reference numeral 1 indicates a signal input terminal; 2 designates a register (hereinafter referred to "line register") with a capacity for storing data of the main scanning direction (in this example, the register 2 can store picture elements of one line; and 3 represents a register (hereinafter referred to "reference register") for storing the signals of the original picture elements to be employed as reference picture elements when performing the scanning line density conversion (in this example; 4 bits), the reference register 3 comprising a register 3b (with two bits $3b_1$ and $3b_2$) for storing signals of received picture elements and a register 3a (with two bits $3a_1$ and $3a_2$) for storing signals of picture elements which have been delayed by one scanning line. Reference numeral 4 denotes a clock pulse generator for producing clock pulses at a signaling speed of at least 16 times the signaling speed of input signals; 5 identifies a counter (in this case, a scale-of-16 counter); 6 shows a coincidence detector; 7 refers to a register (with 16 bits, in this case); indicates a gate; 9 designates a random-access memory (16 words at 16 bits per word); 10 identifies a memory control for controlling transfer of the content of the memory 9 to the register 7; and 11 denotes a signal output terminal; and 12 identifies a clock pulse terminal. In FIG. 2A, synchronizing operation lines are omitted to make illustration and explanation simple.

Figure 2B:
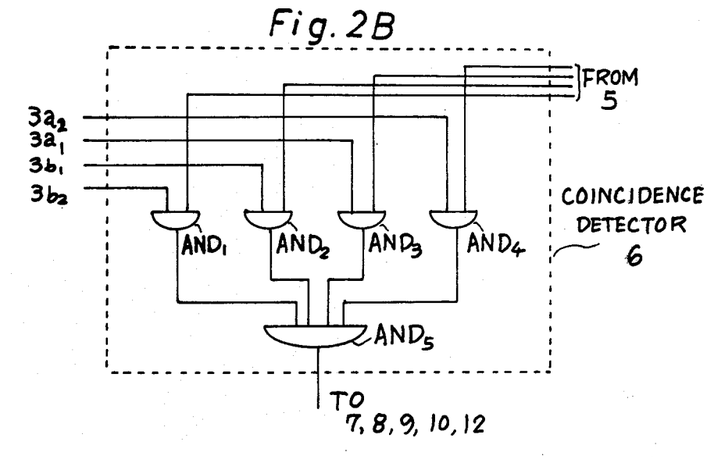
FIG. 2B is a block diagram illustrating an example of a coincidence detector employed in the embodiment shown in FIG. 2A.
Figure 2C:
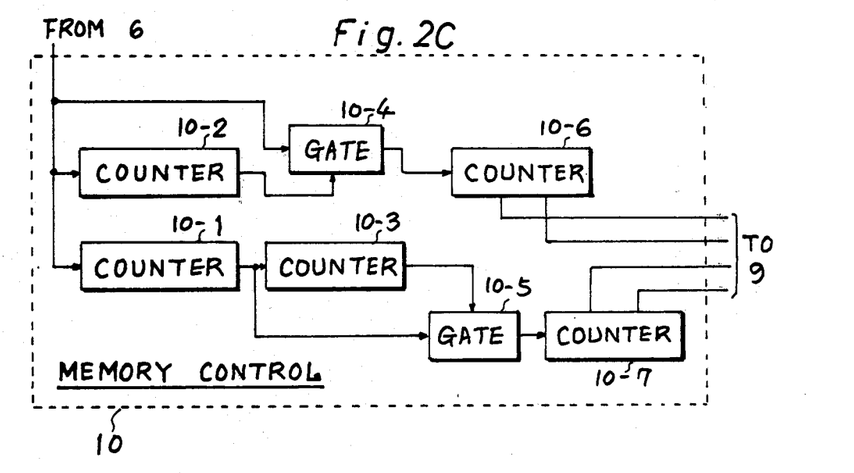
FIG. 2C is a block diagram illustrating an example of a memory control employed in the embodiment shown in FIG. 2A.

The coincidence detector 6 comprises, for example, as shown in FIG. 2B, four AND circuits $AND_1$, $AND_2$, $AND_3$ $AND_4$ for obtaining respective AND outputs of the contents $3a_2$, $3a_1$, $3b_1$ and $3b_2$ of the reference register 3 and the count of the counter 5, and an AND circuit $AND_5$ for obtaining and AND output of the AND circuits $AND_1$, $AND_2$, $AND_3$ and $AND_4$.

Figure 3:
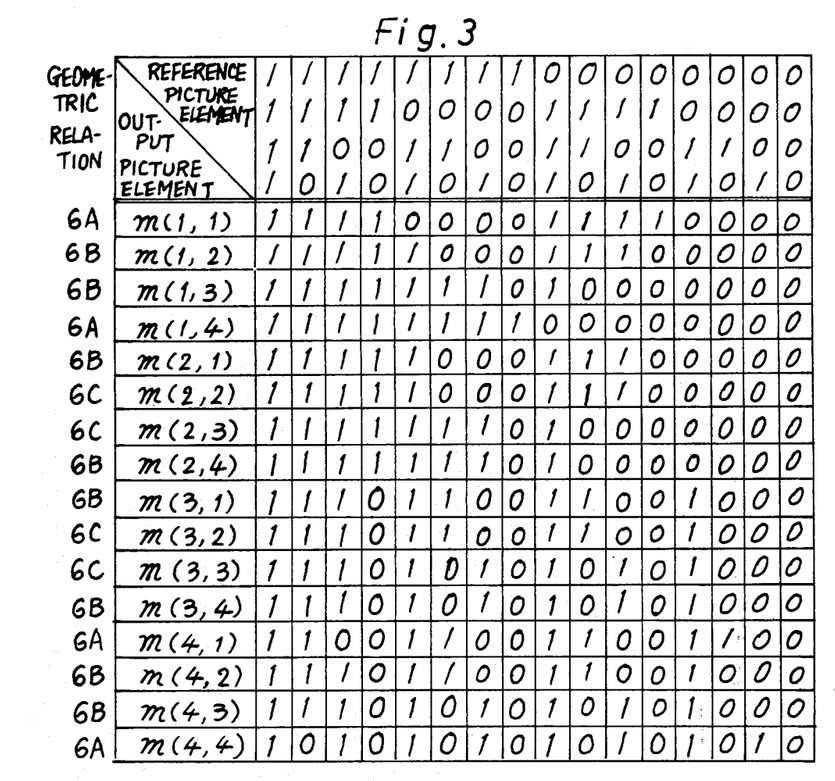
FIG. 3 is a table diagram explanatory of the contents of the table circuit employed in this invention.

The memory 9 has a capacity of 16 words, each consisting of 16 bits. A 256-bit read/write memory of the Texas Instruments type SN 54S200 with 3-state output is satisfactory for the memory 9. As illustrated in FIG. 3, words of the memory 9 correspond respectively to the output picture elements m(1.1), m(1.2), . . . m(i.j), . . . m(4.4); and bits of one word are determined so as to correspond to the combinations of the respective values of reference picture elements ($3a_1$, $3a_2$, $3b_1$, $3b_2$), viz. corresponding to 16 combinations as (0.0.0.0), (0.0.0.1), (0.0.1.0), . . . (1.1.1.1). The respective bits in each word in the memory 9 are written in as in a state determined in accordance with the algorithm as denoted by the equation (1). The reference picture elements, for example, in the case of m(2.2), are n(2.2), n(2.3), n(3.2) and n(3.3). In the case of these reference picture elements n(2.2), n(2,3), n(3.3) assume state (0.0.0.0), the state "0" is written in as the output picture element m(2.2); and in the case of the respective reference picture elements being the state "1", that is, (1.1.1.1), the state "1" is written in as the output picture element m(2.2). Accordingly, if the content of the register 7 is shifted in synchronization with the value of the counter 5 being counted from zero until it comes to coincide with the value of the reference register 3, the value of the output picture element, corresponding to the combination of the values of the reference picture which coincides with the content of the reference register 3, has arrived at the right end bit of the register 7. Upon reading out the right end bit of the register 7, one word in the memory 9 corresponding to the output picture element to be next read out in transferred to the register 7 by the memory control 10. The similar processings are repeated.

The memory control 10 comprises, for example as shown in FIG. 2B, five counters 10-1, 10-2, 10-3, 10-6 and 10-7 and two gates 10-4 and 10-5. The counter 10-1 has a scale equal to the number of picture elements on one scanning line and counts pulses from the coincidence detector 6. Each of the counters 10-2 and 10-3 is a 3-bit binary counter having counting states "0", "1", "2", "3" and "4". Each of the gate circuits 10-4 and 10-5 is controlled by the corresponding output of the counter 10-2 or 10-3 so that the gate is closed only for the counting state "4" but opened for the counting states "0", "1", "2" and "3". In other words, successive four of successive five pulses from the coincidence detector 6 pass through the gate 10-4 except one pulse, while successive four of successive five pulses from the counter 10-1 pass through the gate 10-5 except one pulse. The counters 10-6 and 10-7 count, respectively, output pulses of the gates 10-4 and 10-5. The count states of the counters 10-6 and 10-7 are employed for an address of the memory 9. For a first scanning line, the memory control 10 generates successive address codes of m(1,1) =0000, m(1,2) =0001, m(1,3) =0010, m(1,4) =0011, m(1,1) =0000, m(1,2) =0001, . . . For a next scanning line after the counter 10-1 generates a carry pulse, the memory control 10 produces successive address codes of m(2,1) =0100, m(2,2) =0101, m(2,3) =0110, m(2,4) =0111, m(2,1) =0100, m(2,2) =0101 . . .

Then, the operation of the above system will be described hereinafter. The already-sampled original picture element signals (hereinafter referred to merely as "signals") of a five-scanning-line/mm density which come in though the signal input terminal 1 are sequentially applied to the line register 2 and the register 3b of the reference register 3. In the meantime, the register 3a in the reference register 3 receives, from the line register 2, signals of the immediately preceding scanning line. Thus in the reference register 3, signals of four bits, two bits of them being derived from a different scanning line from that of the other two bits, are stored. For example, in case of determining the value of the picture element m(2.2) of the output picture, the registers 3a and 3b are supplied with signals of n(2.2), n(2.3) and n(3.2), n(3.3), respectively, as evident from the description given in connection with FIG. 1B. When new signals are fed into the reference register 3 in this manner, the content of the counter 5 is counted up from zero by the clock pulses from the clock generator 4, and the coincidence detection between the count content of the counter 5 and the signals in the register 3 is carried out in the coincidence detector 6 for successive count values of the scale-of-16 counter 5. In the meantime, until an output of the coincidence detection is derived from the coincidence detector 6, the signals in the register 7 is shifted in the right direction as indicated by the arrow in synchronization with the clock pulses from the clock generator 4 to be applied to the gate 8; and upon the opening of the gate 8 at the time when the output is derived from the coincidence detector 6, the right end bit of the register 7 mentioned as described above and applied to the gate 8 at this time is delivered out to the signal output terminal 11.

Figure 4:
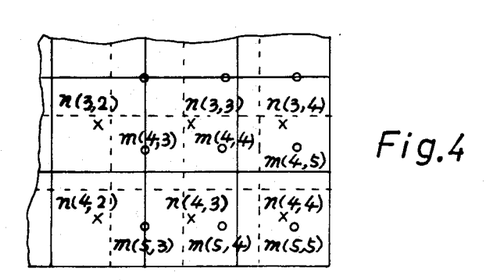

The above description has been given in connection with the example of conversion from 4-lines/mm to 5-lines/mm; but the above principle can be also applied to the reverse case. A description be made of the case of converting the original picture elements n(1.1), n(1.2), . . . n(4.3) and n(4.4) to the output picture elements m(1.1), m(1.2), . . . m(5.4) and m(5.5), for example, the cases of output picture elements m(4.3) and m(5.5), as partially shown in FIG. 4. In the case of the output picture element m(4.3), there are stored in the reference register 3 in FIG. 3 picture elements n(3.2), n(3.3), n(4.2), n(4.3); and in the case of m(5.5), there are stored picture elements n(3.3), n(3.4), n(4.3) and n(4.4), which are each detected for coincidence with the count content of the counter 5; and the output picture element prestored in the memory 9 and corresponding to the input signal is read out by this coincidence output from the register 7 through the gate 8 and then from the output terminal 11. In this case, however, it is natural that the word configuration in the memory 9 are different from those shown in FIG. 3.

Figure 5:
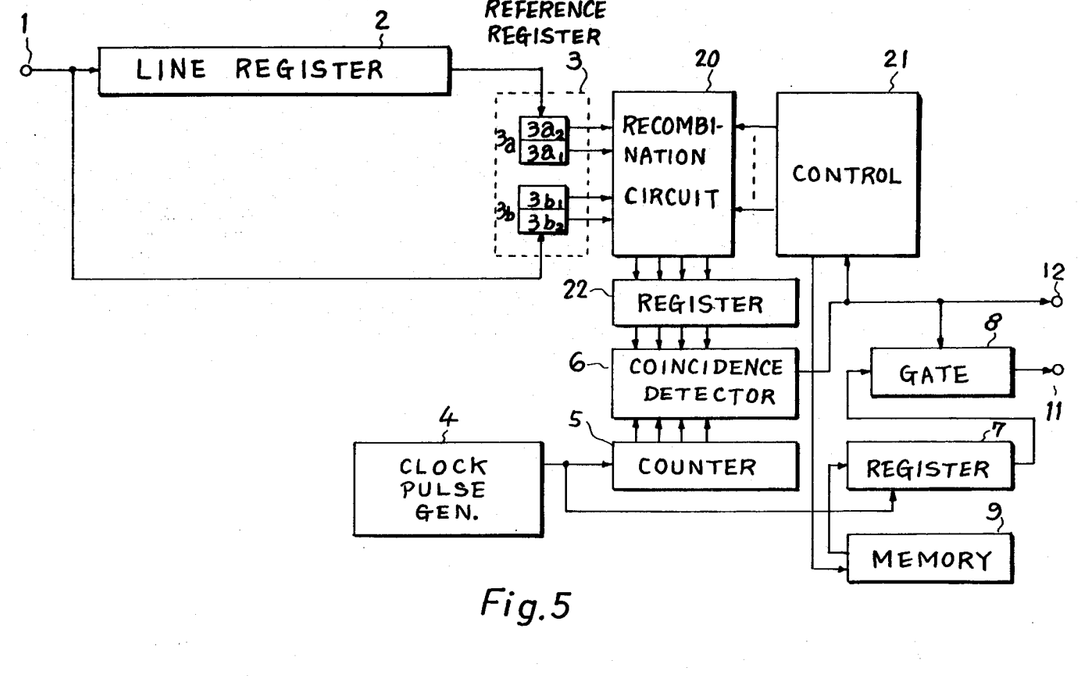
FIG. 5 is a block diagram illustrating another embodiment of this invention.

FIG. 5 illustrates another embodiment of the invention, which, as in FIG. 2A, shows the case of converting the scanning line density from 5 lines/mm to 4 lines/mm. The reference numerals in FIG. 5 are the same as those in FIG. 2A in function, unless otherwise noted. Reference numeral 20 indicates a recombination circuit, which, for example, comprises a diode matrix array. Reference numeral 21 designates a control which has the function of the memory control 10 in FIG. 2A, and also a function periodically to apply a control signal to the recombination circuit 20.

Figure 6A:
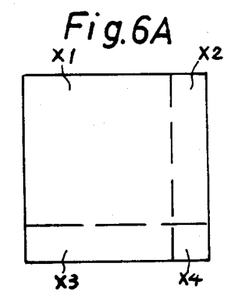
FIGS. 6A–C and 9 are diagrams illustrating examples of combinations of the zones of an input original picture and an output picture explanatory of the principle of this invention.
Figure 6B:
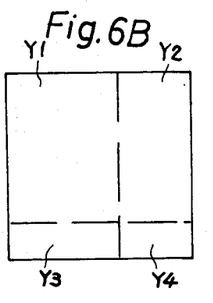
Figure 6C:
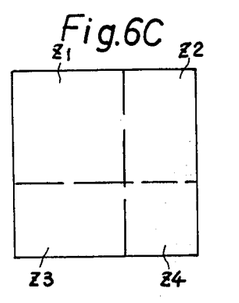

FIGS. 6A, 6B and 6C illustrate the kinds of combinations of areas for the superimposing of the original picture on the output picture in the case of FIG. 1A. Reference characters X1, X2, X3, X4, Y1, Y2, Y3, Y4, Z1, Z2, Z3 and Z4 respectively indicate partial zones of original picture elements divided by broken lines. Namely, in the case of FIG. 1A, the kinds of combinations of superimposed areas are divided into three, as shown in FIGS. 6A, 6B and 6C, which periodically appear for successive input signals.

Now, if a new signal is fed into the reference register 3 in FIG. 5, these 4-bit signals are supplied to the recombination circiut 20. The recombination circuit 20 is subject to be periodically controlled by the control 21 to rearrange the signals from the reference register 3, which signals are transferred to a register 22. In the recombination circuit 20, the signals stored in the reference register 3 for determining a picture element m(1.1) are signals n(1.1), n(1.2), n(2.1) and n(2.2) and, in this case, these signals are transferred, without any change in their arrangement, to the register 22 as signals n(1.1), n(1.2), n(2.1) and n(2.2). The signals n(1.4), n(1.5), n(2.4) and n(2.5) in the reference register 3 for determining a picture element m(1.4) are converted to the arrangment of signals n(1.5), n(1.4), n(2.5) and n(2.4), and transferred to the register 22. While in the cases of picture elements m(1.2) and m(2.2), signals in the reference register 3 are transferred, without any change of their arrangement, to the register 22; in the case of a picture element m(2.1), the arrangement of signals n(2.1), n(2.2), n(3.1), n(2.2) and n(3.2) is converted to the signal arrangement, which corresponds to FIG. 6B, and in the case of a picture element m(2.3), the arrangement of signals n(2.3), n(2.4), n(3.3) and n(3.4) is converted to the signal arrangement which corresponds to FIG. 6C, that is, signals n(2.4), n(2.3), n(3.4) and n(3.3). In the case of a picture element m(i.j), the conversion is similar to the above. That is to say, if the zone input signals, whose positional arrangement in the picture is the same as that of FIG. 6A, exist in the reference register 3, the signals in the register 22 are rearranged so as to constantly become values X1, X2, X3 and X4; and in the case of 6B or 6C, the input signals in the register 22 are arranged into values Y1, Y2, Y3 and Y4, or values Z1, Z2, Z3 and Z4. In the case of FIG. 1B, the arrangement of the signals corresponds to FIG. 6C.

Figure 7:
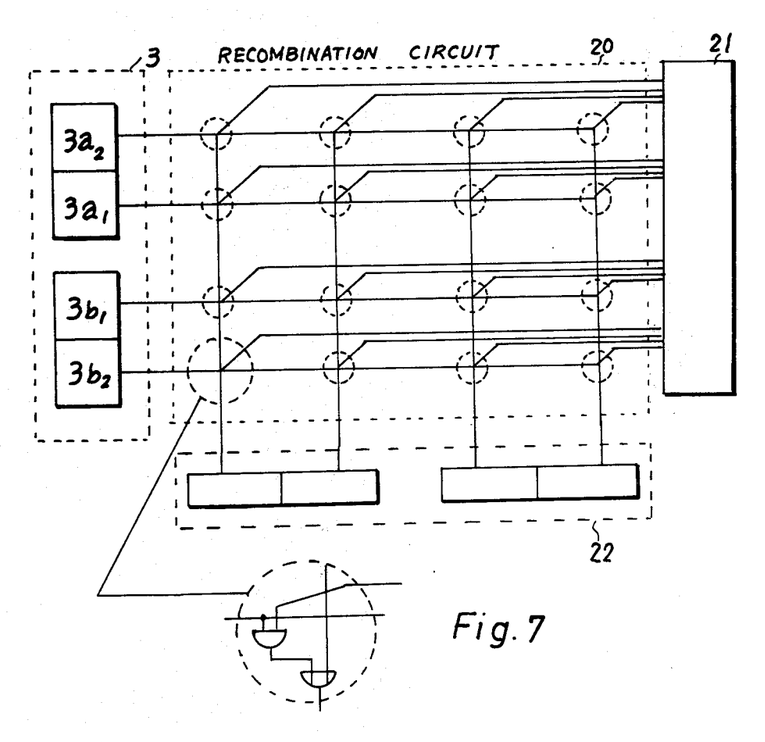
FIG. 7 is a circuit diagram illustrating an example of the combination circuit employed in the embodiment of this invention shown in FIG. 5.

As a specific example of the recombination circuit 20, a matrix array can be formed as shown in FIG. 7. In FIG. 7, reference characters $g_{11}$, $g_{12}$, . . . $g_{43}$, $g_{44}$ denote gates of the matrix array. The operation of this circuit is as follows: supposing that signals n(1, 4), n(1, 5), n(2, 4) and n(2, 5) are respectively applied from bits $3a_2$, $3a_1$, $2b_1$ and $3a_2$ of the reference register 3, and that the signals of "01001000000 10010" are applied to the signal lines of the control 21, gates $g_{12}$, $g_{21}$, $g_{34}$ and $g_{43}$ are opened, so that into the register 22 are sequently fed from the left side the signals n(1, 5), n(1, 4), n(2, 5) and n(2, 4) with their arrangement modified. In the case of no rearrangement of reference signals, the signals of "0000 0000 0000 0000" are applied to the signal line of the control 21.

The subsequent operations in the embodiment shown in FIG. 5 are all carried out in the same manner as in the example of FIG. 2A. In the case of the present embodiment, however, the memory 9 of a relatively small capacity can be employed. That is, though the value of 16 bits per word is not altered, the number of words do not exceed three words in accordance with the combinations shown in FIGS. 6A, 6B and 6C.

Upon the employment of the recombination circuit 20 as above, the capacity of the memory 9 shown in FIG. 2A can be reduced. This has not much effect in a case where the number of combinations shows in FIGS. 6A, 6B and 6C is small for conversion between the 5-lines/mm scanning line density and the 4-lines/mm scanning line density; but where the number of combinations on one side is greatly increased as 4 lines/mm and 3.85 lines/mm, since it is possible to largely reduce the capacity of the memory 9, the effect becomes great.

The above-described function is also applicable to the conversion of an original picture of p lines/mm to an output picture of q lines/mm.

Although the case of p > q has been described in the above, in the case of p < q the desired results can be obtained by a more modification of the memory content, the controlling sequence by the control and the number of bits at a part of the circuits.

The foregoing description has been given of the case in which the tone values of output picture elements are determined in proportion to the product of the superimposed area ratio of the output picture elements on the reference picture elements and the tone value of the latter elements. Besides the above, however, there also exists a principle for determining the tone value of converted picture elements as a function of the distance between the center of the output picture elements and that of the reference picture elements. Hereunder, a description will be given of this principle in reference, for simplicity's sake, to a case of binary signals. In a case where the picture element at a certain point is white or black, suppose that the probability of the picture element at a point spaced a distance r from the above point is white or black is p(r).

Figure 8:
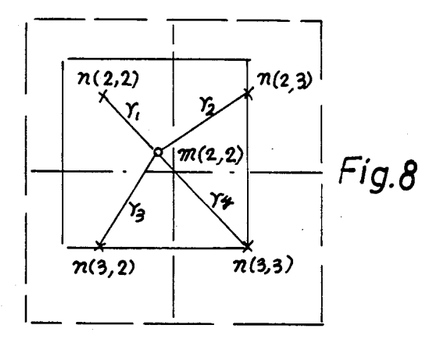

FIG. 8 is a diagram, in which the same positional relation as these in FIG. 1B are used, and in which the distance between the center of the output picture element m(2, 2) and the center of the original picture element n(2, 2) is taken as $r_1$; and the distances between the center of the output picture element and the original picture elements n(2, 3), n(3, 2) and n(3, 3) are taken as $r_2$, $r_3$, and $r_4$, respectively. Now, supposing that Vn (i, j) indicates the tone value of the picture element (i, j), and "1" representative of the white picture elements, and "−1" indicates the black picture elements, and the tone value of picture element m(2, 2) is assumed to be:

$$\Sigma = P(r_1) \times Vn(2, 2) + P(r_2) \times Vn(2, 3) + P(r_3) \times Vn(3, 2) + P(r_4) \times Vn(3, 3);$$

if so, it is determined as: if $\Sigma \geq 0$, Vm(2, 2)=1, viz., white, and if $\Sigma < 0$, Vm(2, 2)=−1, viz., black.

Since, as stated above, the formula for determining the tone value of output picture elements as a function of distance takes minute parts into account in comparison with the formula which determines the tone value of the output picture elements as the function of the aforementioned area, its conversion distortion becomes can be effectively reduced.

Figure 9:
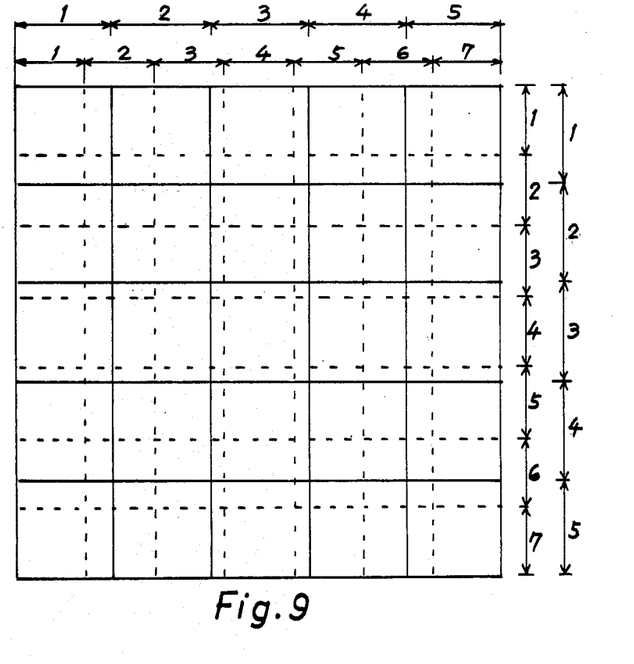

In the practical embodiment for such a case for the conversion of 5 lines/mm to 4 lines/mm, the construction as shown in FIG. 2A or FIG. 5 are applicable as they are. However, since the values determined in accordance with the just described algorithm are stored in the memory 9, the content of the memory 9 is different from the foregoing example. The operations in the examples of FIGS. 2A and 5 are substantially the same as already explained above. The above described systems, in the conversion operations of 5 lines/mm to 4 lines/mm, 7 lines/mm to 5 lines/mm, and etc., can make common use of a conversion table circuit in the case of the same positional relations, and circuitry can be more simplified as a whole. FIG. 9 exemplifies the combination of original picture element and the output picture elements in the case of conversion from 7 lines/mm to 5 lines/mm. In this case, the output picture elements may include nine original picture elements. In such a case, capacities of the line register 2 and the reference register 3, etc. as used in the practical embodiment have to be further added.

As described in detail above, for the purpose of converting input facsimile signals to output facsimile signals of the scanning line density different from that of the input facsimile signals, the system of the present invention is provided with a table circuit which, in consideration of a state of superimposing the input pattern on the output pattern denoted respectively by the input facsimile signals and output facsimile signal under the correctly maintained positional relationship between the patterns as shown in FIGS. 1A and 1B, 4 and 9, develops the white and black states of each output picture element in correspondence to a predetermined number of combinations of states of reference picture elements and the geometric relation between the output picture element and the reference picture elements of the output picture elements. The reference picture elements correspond to at least one input picture element of the input facsimile signal adjacent to each output picture element of the output facsimile signal as shown in FIG. 3. Furthermore, the system is designed, to read successively the respective white and black states of the output picture elements from the table circuit to be taken out as output facsimile signals, as illustrated in the example of FIGS. 2A and 5 in view of the abovesaid geometric relation which varies in response to each entry of the successive picture elements of the input facsimile signals and the state of the abovesaid reference picture elements corresponding to the geometric relation.

What we claim is:

1. A facsimile signal converter comprising:

input terminal means for receiving an input facsimile signal;

table circuit means for storing words of white and black states of each output picture element of an output facsimile signal in correspondence to a predetermined number of combinations of states of reference picture elements and the geometric relation between the reference picture elements and the output picture elements, said reference picture elements corresponding to at least one input picture element of the input facsimile signal adjacent to each output picture element of the output facsimile signal in consideration of a state of superimposing an input pattern on an output pattern indicated respectively by the input facsimile signal and the output facsimile signal:

output terminal means for obtaining said output facsimile signal having a scanning line density different from that of the input facsimile signal; and readout means connected to said input terminal means, said table circuit means and output terminal means for reading out the white and black states of the output picture elements from the table circuit to provide the output facsimile signal in response to each input picture element of the input facsimile signal on the base of the instant states of the geometric relation and the reference picture elements.

2. A facsimile signal converter according to claim 1, in which said readout means comprises;

a first register connected to said input terminal means for shifting said input picture elements for one scanning line, a second register connected to the input and output of said first register and having a first part and a second part to store bits of said reference picture elements, the first part temporarily storing at least two bits of said input picture elements, the second part temporarily storing at least two bits of said picture elements delayed by one scanning line from the abovesaid two bits, a clock pulse generator for generating clock pulses having a repetition frequency higher, by the number of bits times of each of said words, than the signaling speed of said input facsimile signal, a counter having a scale of $2^i$ (where "i" is equal to the number of bits in the second register) and counting said clock pulses, a coincidence detector connected to said second register and said counter for generating a coincidence pulse when the count value of the counter coincides with said bits of said second register, a third register connected to said table circuit means and said clock pulse generator for temporarily storing one of said words readout from said table circuit means and for shifting bits of said one readout word in synchronism with said clock pulses, control means connected to said table circuit means and said coincidence detector for successively reading out said words from said table circuit means to said third register in response to said coincidence pulse, ad gate means connected to said third register, the coincidence detector and said output terminal means for passing the register output to said terminal means in response to said coincidence pulse.

3. A facsimile signal converter according to claim 1, in which said table circuit includes means for determining and storing tone values of said output picture elements in proportion to the product of the superimposed area ratio of the output picture elements on the reference picture elements and the tone value of the later elements.

4. A facsimile signal converter according to claim 1, in which said table circuit includes means for determining and storing tone values of said output picture elements as a function of the distance between the center of the output picture elements and that of the reference picture elements.

5. A facsimile signal converter according to claim 1, in which said readout means comprises a first register connected to said input terminal means for shifting said input picture elements for one scanning line, a second register connected to the input and output of said first register and having a first part and a second part to store bits of said reference picture elements, the first part temporarily storing at least two bits of said input picture elements, the second part temporarily storing at least two bits of said picture elements delayed by one scanning line from the abovesaid two bits, a clock pulse generator for generating clock pulses having a repetition frequency higher, by the number of bits times of each of said words, than the signaling speed of said input facsimile signal, a counter having a scale of $2^i$ (where "i" is equal to the number of bits in the second register) and counting said clock pulses, a third register connected to said table circuit means and said clock pulse generator for temporarily storing one of said words readout from said table circuit means and for shifting bits of said one readout word in synchronism with said clock pulses, a recombination circuit connected to said second register for recombining the arrangement of bits of said reference picture elements to develope recombined bits of said reference elements so as to reduce the number of states of said geometric relation, a fourth register connected to said recombination circuit for temporarily storing said recombined bits of said reference picture elements, a coincidence detector connected to said fouth register and said counter for generating a coincidence pulse when the count value of the counter coincides with said recombination bits of said reference picture elements, control means connected to said table circuit means, said recombination circuit and said coincidence detector for successively reading out said words from said table circuit means ro said third register in response to said coincidence pulse and for controlling said recombination operation of said recombination ciricut in synchronism with said coincidence pulse, and gate means connected to said third register, the coincidence detector and said output terminal means for passing the output bit of said third register to said output terminal means in response to said coincidence pulse.

6. a facsimile signal conveter according to claim 5, in which said recombination circuit comprises a diode matric array formed by elements equal in number to the number of bits squared of said reference picture elements.

* * * * *